(12) United States Patent
Page et al.

(10) Patent No.: US 7,726,944 B2
(45) Date of Patent: Jun. 1, 2010

(54) TURBINE BLADE WITH IMPROVED DURABILITY TIP CAP

(75) Inventors: Richard H. Page, Guilford, CT (US); Wieslaw A. Chlus, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 843 days.

(21) Appl. No.: 11/524,102

(22) Filed: Sep. 20, 2006

(65) Prior Publication Data
US 2010/0080711 A1    Apr. 1, 2010

(51) Int. Cl.
*F01D 5/18* (2006.01)
(52) U.S. Cl. .......................................................... 416/92
(58) Field of Classification Search .................... 416/92
See application file for complete search history.

(56) References Cited

U.S. PATENT DOCUMENTS

| | | | | |
|---|---|---|---|---|
| 3,635,585 A * | 1/1972 | Metzler, Jr. | ............... | 416/96 R |
| 3,899,267 A * | 8/1975 | Dennis et al. | ................. | 416/92 |
| 4,020,538 A * | 5/1977 | Dennis et al. | ........... | 29/889.721 |
| 4,214,355 A * | 7/1980 | Zelahy | ....................... | 29/889.1 |
| 4,390,320 A * | 6/1983 | Eiswerth | .................... | 416/97 R |
| 4,540,339 A * | 9/1985 | Horvath | ........................ | 416/92 |
| 4,589,823 A * | 5/1986 | Koffel | .......................... | 416/92 |
| 4,790,721 A * | 12/1988 | Morris et al. | ............. | 416/96 A |
| 4,893,987 A * | 1/1990 | Lee et al. | ....................... | 416/92 |
| 5,564,902 A * | 10/1996 | Tomita | ..................... | 416/97 R |
| 5,980,209 A * | 11/1999 | Barry et al. | ............. | 416/223 A |
| 7,001,151 B2 * | 2/2006 | Wang et al. | .................... | 416/92 |
| 7,513,743 B2 * | 4/2009 | Liang | .......................... | 416/92 |
| 2005/0196277 A1 * | 9/2005 | Wang et al. | .................... | 416/92 |
| 2007/0258815 A1 * | 11/2007 | Liang | ........................ | 416/97 R |
| 2008/0118366 A1 * | 5/2008 | Correia et al. | ............ | 416/97 R |
| 2008/0237403 A1 * | 10/2008 | Kelly et al. | ................ | 244/34 A |

* cited by examiner

*Primary Examiner*—Edward Look
*Assistant Examiner*—Aaron R Eastman
(74) *Attorney, Agent, or Firm*—Carlson, Gaskey & Olds

(57) ABSTRACT

A gas turbine engine has a turbine blade having a tip cap to close off internal cooling passages. The tip cap is formed with a plurality of purge holes, with there being at least two rows of purge holes. The increased number of purge holes spreads the cooling air outwardly across more of the surface area of the tip cap, and provides the tip cap with a better ability to withstand the extreme temperatures it faces in use.

12 Claims, 5 Drawing Sheets

TURBINE BLADE WITH IMPROVED DURABILITY TIP CAP

BACKGROUND OF THE INVENTION

This application relates to a turbine blade, wherein a tip cap for sealing off internal cooling passages has an improved purge hole arrangement, with two rows of purge holes.

Gas turbine engines typically include a plurality of sections acting in concert. Generally, a fan section delivers air into a compressor section. Air is compressed in the compressor section and delivered into a combustion section. The compressed air is mixed with fuel and combusted, and the products of combustion move downstream over a series of turbine rotors. The turbine rotors each include a plurality of blades, which are driven by the products of combustion to rotate the turbine rotors.

A good deal of design goes into the turbine blades. In particular, they are exposed to extremely hot temperatures. Internal cooling air passages are formed within the blades. The internal cooling passages are often serpentine, and circulate air from a radially inner location adjacent a platform, radially outwardly towards a tip of the blade, and then back toward the platform. The formation of these passages is facilitated if the tip of the blade is initially cast as an open end. Thus, the blade is typically cast with its end open, and a tip cap is later attached to close the end. The tip cap may be welded or brazed to the remainder of the blade body.

The tip caps are typically formed with a single row of purge holes. The purge holes allow some air from the cooling channels to escape outwardly and carry dirt. This removes the dirt from the cooling channels, where it otherwise might build up.

There are challenges with regard to the tip caps in that they have experienced field distress. As an example, there has been oxidation, cracking, bulging, etc. due to the high operating temperatures experienced by the tip caps. This becomes particularly acute in the first turbine blade row.

SUMMARY OF THE INVENTION

In a disclosed embodiment of this invention, the purge holes in a tip cap are formed in at least two rows. The double row of purge holes provides increased cooling coverage across the tip cap. The holes may be made smaller than they have been in the prior art such that the volume of air escaping the additional purge holes is not much more than the volume of air escaping the prior art single row tip cap.

In addition, the purge holes may be angled outwardly toward the inner walls of a recess that receives the tip cap. In this manner, the inner walls are directly cooled by impingement air.

These and other features of the present invention can be best understood from the following specification and drawings, the following of which is a brief description.

DETAILED DESCRIPTION OF THE PREFERRED EMBODIMENT

Figure 1:
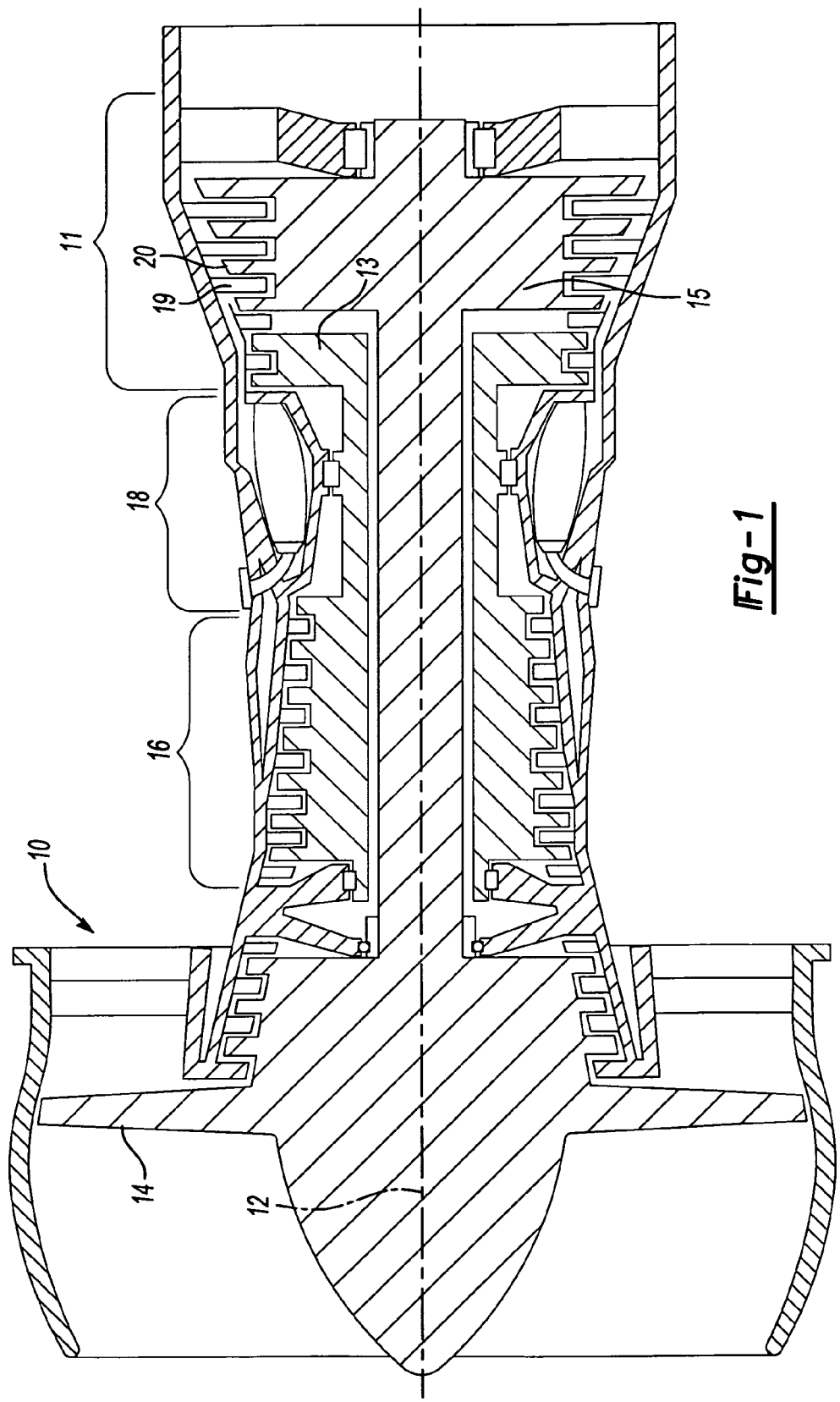
FIG. 1 is a schematic view of a gas turbine engine.

FIG. 1 shows a gas turbine engine 10, such as a gas turbine used for propulsion, circumferentially disposed about an engine centerline, or axial centerline axis 12. The engine 10 includes a fan 14, a compressor 16, a combustion section 18 and a turbine 11. As is well known in the art, air compressed in the compressor 16 is mixed with fuel that is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and fan 14. The turbine 11 comprises alternating rows of rotary blades 20 and static airfoils or vanes 19. FIG. 1 is a schematic representation, for illustrative purposes only, and is not a limitation on the instant invention that may be employed on gas turbines used for electrical power generation, aircraft propulsion, or for other applications.

Figures 2A, 2B:
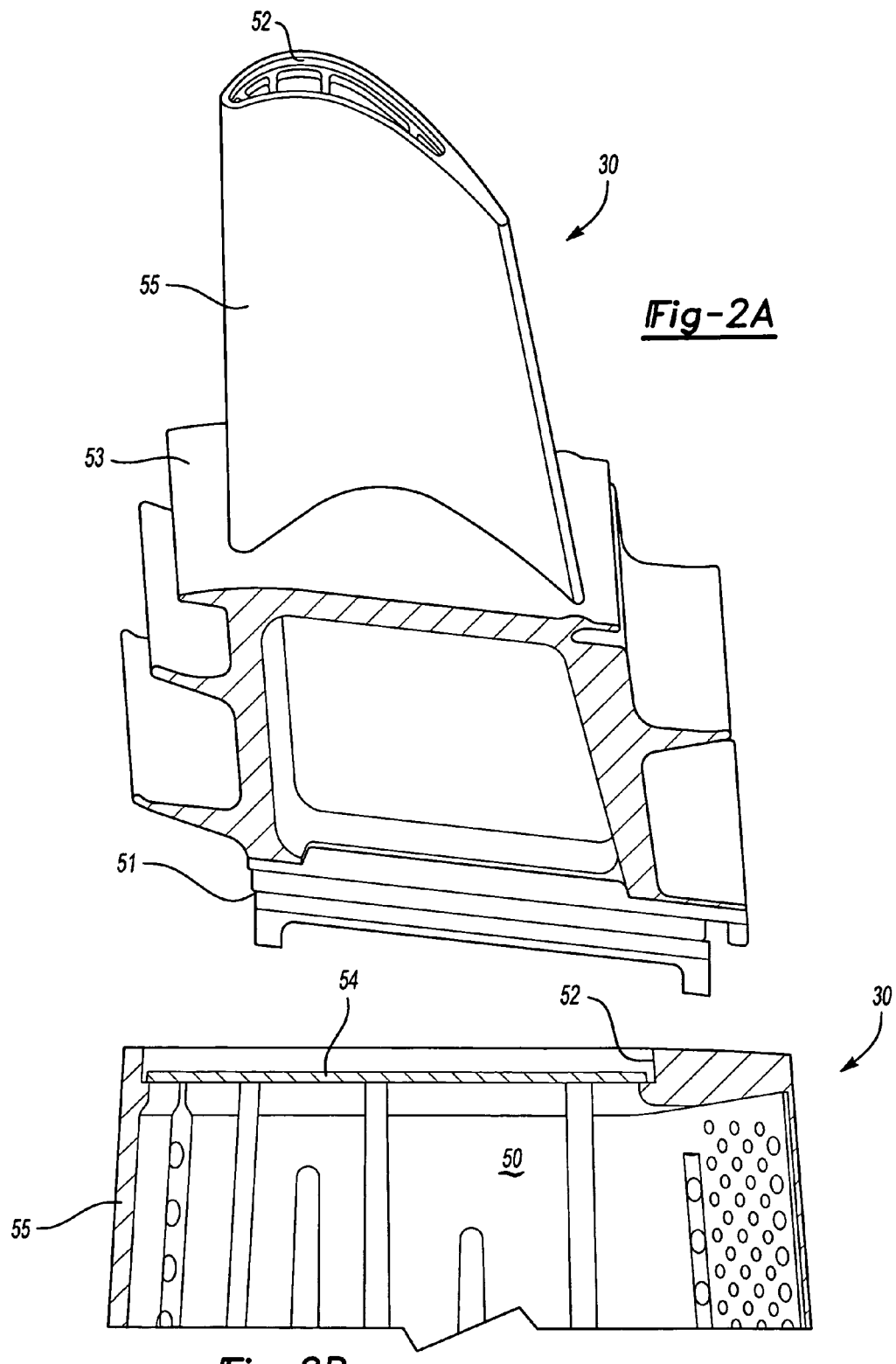
FIG. 2A is a perspective view of a turbine blade.
FIG. 2B is a cross-sectional view through the prior art turbine blade.

A turbine blade 30 is illustrated in FIG. 2A. As known, a root section 51 secures the turbine blade within a turbine rotor. A platform 53 has an airfoil 55 extending radially outwardly therefrom. A recess 52 is formed at the radially outer tip of the airfoil 55, and receives a tip cap 54, as shown in FIG. 2B. As known, a series of cooling channels 50 are formed within the airfoil 55, and circulate air to cool the interior of the turbine blade 30. Tip cap 54 is received in the recess 52, and closes off channels such as the channel 50 to provide serpentine air flow.

Figure 3A:
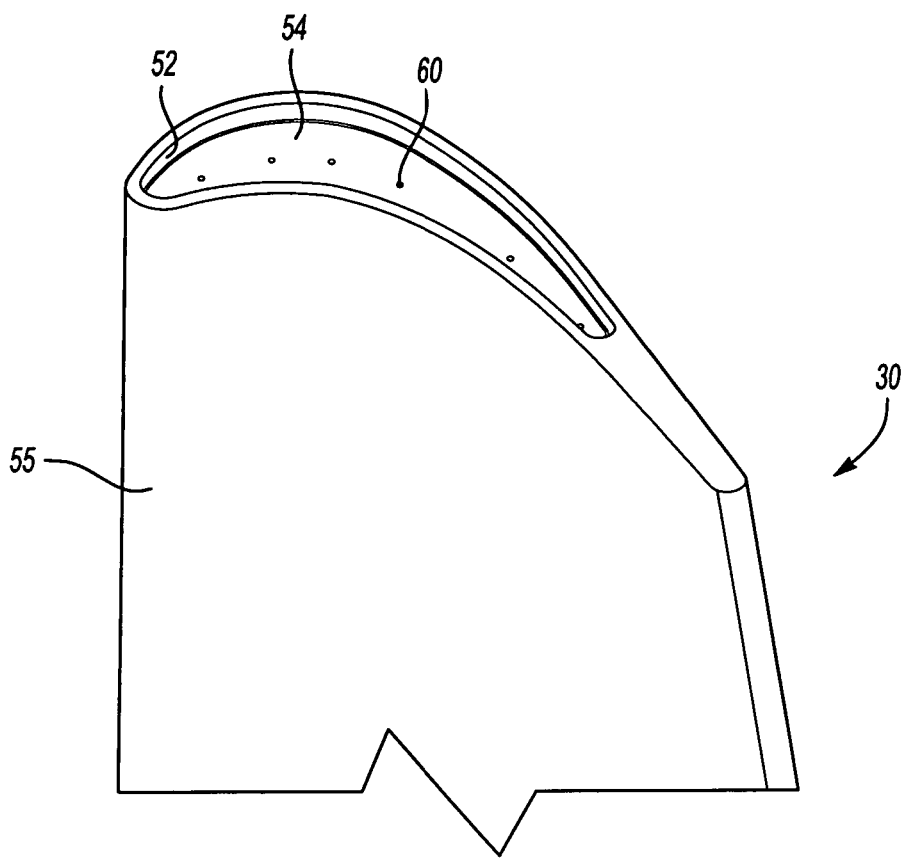
FIG. 3A shows a view of the tip of the prior art turbine blade.
Figure 3B:
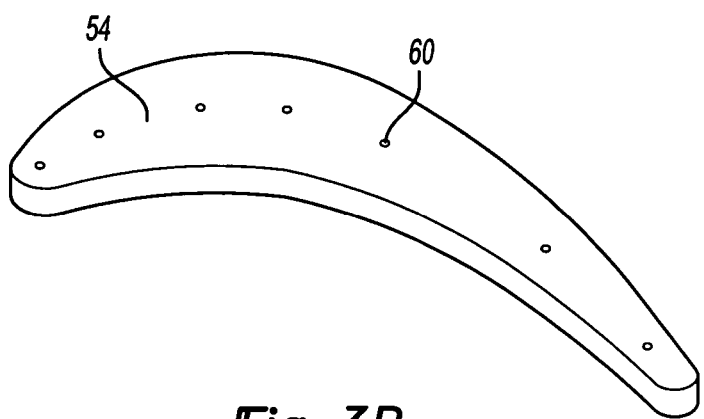
FIG. 3B is a view of the prior art tip cap.

As shown in FIGS. 3A and 3B, the tip cap 54 has a single row of purge holes 60. As mentioned above, with this prior art structure, there has been some distress to the tip caps due to the high temperatures faced by the turbine blades.

Figure 4A:
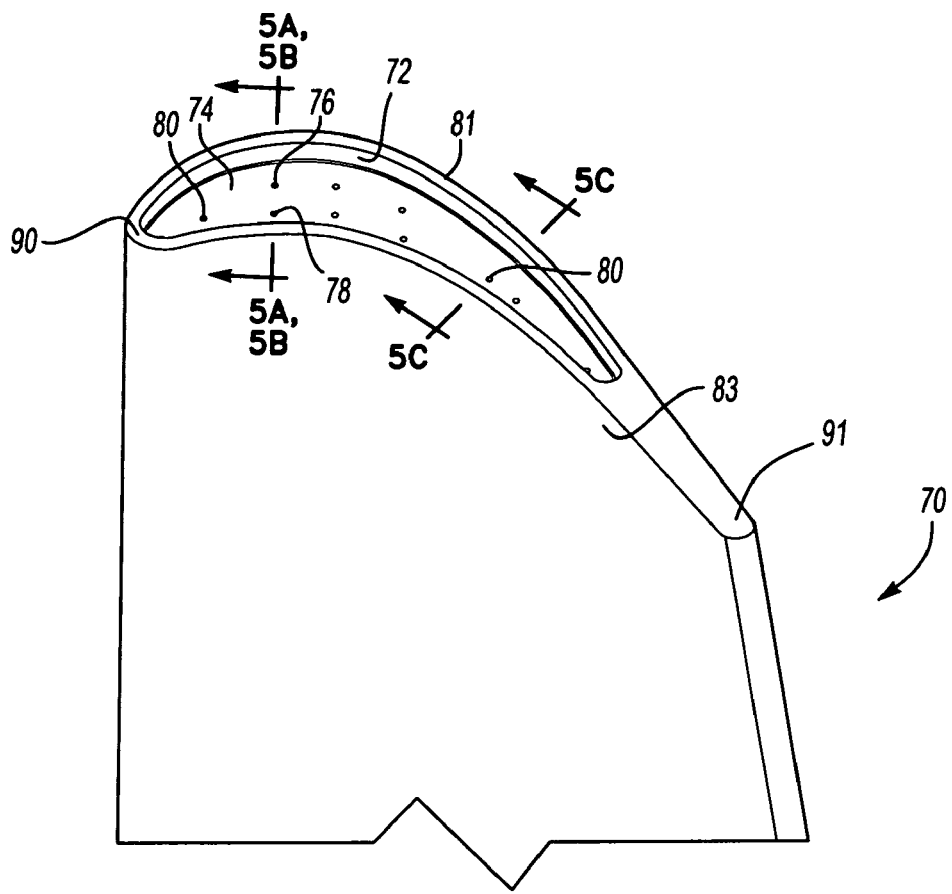
FIG. 4A shows the tip of the inventive turbine blade.
Figure 4B:
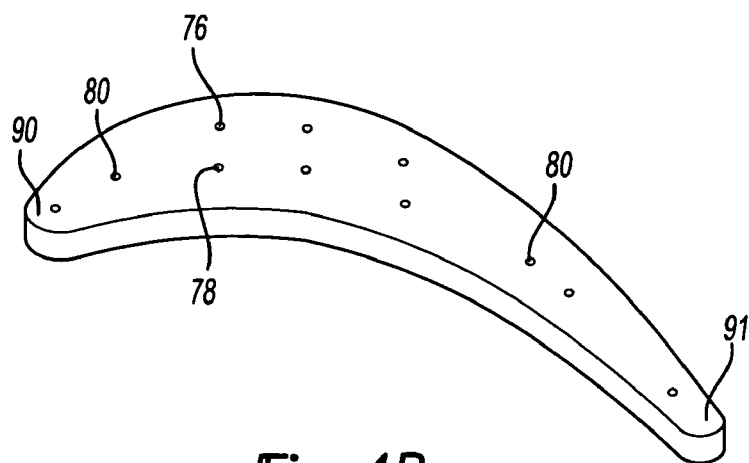
FIG. 4B shows the inventive tip cap.

FIGS. 4A and 4B show an inventive airfoil 70 and tip cap 74. The recess 72 receives a tip cap 74 that has at least two rows of purge holes 76 and 78 for at least a portion of its length. As shown, other purge holes 80 are formed in a single row at distinct locations.

A suction wall 81 and a pressure wall 83 define the two sides of the airfoil. There are two rows of purge holes 76 and 78 spaced between walls 81 and 83. As shown, two single holes 80 are formed spaced toward the leading edge 90 and three single holes 80 are formed spaced toward the trailing edge 91. The double row of purge holes is intermediate these sections.

With this inventive arrangement of additional holes, greater cooling may be provided to the tip cap, and the tip cap is better able to withstand the high temperatures it will face.

Figure 5A:
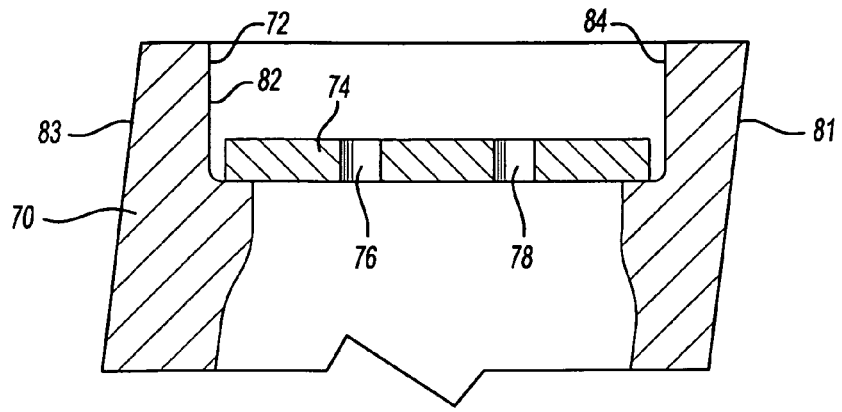
FIG. 5A is a cross-sectional view along line 5A-5A as shown in FIG. 4A.
Figure 5B:
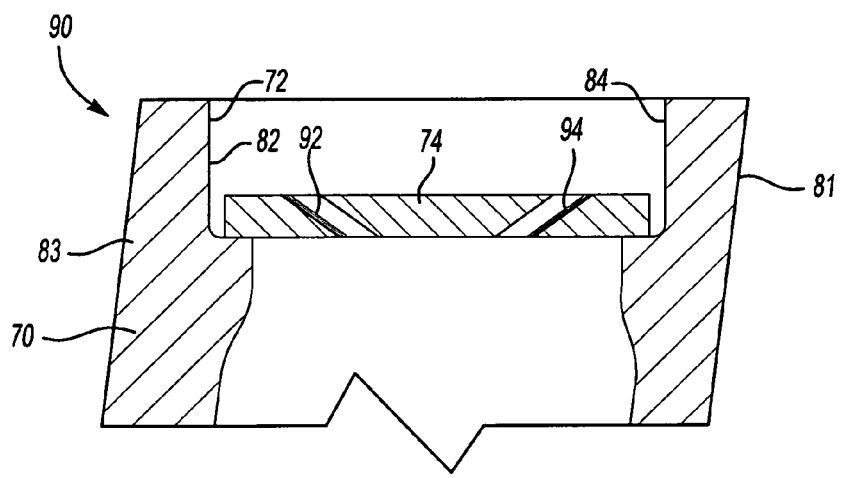
FIG. 5B is a second embodiment, which would be taken along the same cross-section as FIG. 5A.

As shown in FIG. 5A, the holes 76 and 78 may extend generally in a radial direction, and parallel to surfaces of spaced inner walls 82 and 84 which form a portion of the recess 72. However, as shown in FIG. 5B, in another embodiment, the holes 92 and 94 may be angled outwardly toward the walls 82 and 84. The angle may be between 25 and 50°.

Figure 5C:
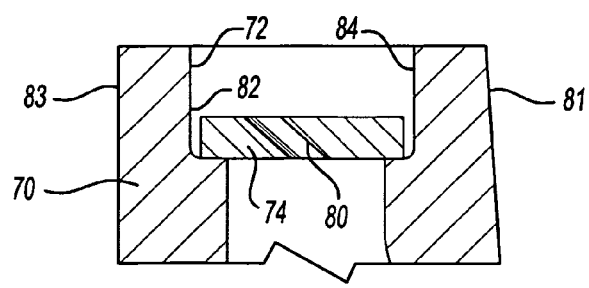
FIG. 5C is a view along line 5C-5C as shown in FIG. 4A.

As shown in FIG. 5C, the hole 80 may also be angled toward one of the walls 82 and 84.

The size of the holes in the inventive tip caps may range from 0.020 up to 0.045" in diameter. In one embodiment, there were 10 holes formed at 0.025" with two formed at 0.035". In the prior art, the holes were typically all of a single diameter, in one embodiment 0.04". The use of the smaller holes in addition to the provision of additional holes allows the volume of air leaving the tip cap to be maintained at the same or nearly the same level as in the prior art design (if desired) by simply the spreading out of the air across the tip cap to provide better cooling.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tip cap for a gas turbine engine turbine blade comprising:
    a plurality of purge holes to allow air from cooling channels in said turbine blade to move outwardly through said tip cap and radially outwardly of said turbine blade, said purge holes being formed in at least two rows at distinct locations between a suction side and a pressure side of said turbine blade;
    said tip cap including two portions having only one row of purge holes with a first spaced toward a leading edge of said turbine blade, and a second toward a trailing edge of said turbine blade and from a central portion of said tip cap having said at least two rows of purge holes; and
    there being at least two diameters to said purge holes.

2. The tip cap as set forth in claim 1, wherein said purge holes have a diameter of between 0.020 and 0.045".

3. The tip cap as set forth in claim 1, wherein said turbine blade includes a support recess having internal walls on both a pressure and a suction side of said turbine blade, and said purge holes extending directly radially outwardly through said tip cap.

4. The tip cap as set forth in claim 1, wherein at least some of said purge holes extend at an angle toward at least one of an internal wall of said turbine blade.

5. The tip cap as set forth in claim 4, wherein said purge holes that are aligned in two rows extend at an angle outwardly toward a closest one of said internal walls.

6. The tip cap as set forth in claim 1, wherein said first portion having two purge holes spaced toward said leading edge from said central portion, and said second portion having three purge holes spaced toward said trailing edge from said central portion.

7. A turbine blade for a gas turbine engine comprising:
    a platform with an airfoil extending radially outwardly from said platform, said airfoil including internal cooling channels, said cooling channels routing air from a location adjacent said platform radially outwardly towards a tip of said airfoil, and said tip of said airfoil including a support recess for receiving a separate tip cap, said tip cap closing off said cooling channels, and said tip cap including a plurality of purge holes to allow air from said cooling channels to move outwardly through said tip cap and radially outwardly of said airfoil, said purge holes being formed in at least two rows at distinct locations between a suction side and a pressure side of said airfoil;
    said tip cap including two portions having only one row of purge holes with a first spaced toward a leading edge of said turbine blade, and a second toward a trailing edge of said turbine blade and from a central portion of said tip cap having said at least two rows of purge holes; and
    there being at least two diameters to said purge holes.

8. The turbine blade for a gas turbine engine as set forth in claim 7, wherein said purge holes have a diameter of between 0.020 and 0.045".

9. The turbine blade for a gas turbine engine as set forth in claim 7, wherein said support recess includes internal walls on both said pressure and said suction sides of said airfoil, and said purge holes extending directly radially outwardly through said tip cap.

10. The turbine blade for a gas turbine engine as set forth in claim 7, wherein at least some of said purge holes extend at an angle toward at least one of said internal walls.

11. The turbine blade for a gas turbine engine as set forth in claim 10, wherein said purge holes that are aligned in two rows extend at an angle outwardly toward a closest one of said internal walls.

12. The turbine blade as set forth in claim 7, wherein said first portion having two purge holes spaced toward said leading edge from said central portion, and said second portion having three purge holes spaced toward said trailing edge from said central portion.

* * * * *